March 2, 1965   W. B. BOICE   3,171,454
MEANS FOR ADJUSTING POSITIONS OF JOINTER CUTTERS
Filed July 30, 1963   4 Sheets-Sheet 1

INVENTOR.
William B. Boice
BY John F. Brezina
His attorney

March 2, 1965 W. B. BOICE 3,171,454
MEANS FOR ADJUSTING POSITIONS OF JOINTER CUTTERS
Filed July 30, 1963 4 Sheets-Sheet 2

INVENTOR.
William B. Boice
BY
John F. Brezina
His Attorney

March 2, 1965 W. B. BOICE 3,171,454
MEANS FOR ADJUSTING POSITIONS OF JOINTER CUTTERS
Filed July 30, 1963 4 Sheets-Sheet 3

INVENTOR.
William B. Boice
BY John F. Brezina
His Attorney

March 2, 1965 W. B. BOICE 3,171,454

MEANS FOR ADJUSTING POSITIONS OF JOINTER CUTTERS

Filed July 30, 1963 4 Sheets-Sheet 4

INVENTOR.
William B. Boice
BY John F. Brezina
His Attorney

United States Patent Office 3,171,454
Patented Mar. 2, 1965

3,171,454
MEANS FOR ADJUSTING POSITIONS OF JOINTER CUTTERS
William B. Boice, Toledo, Ohio, assignor to Wilton Corporation, a corporation of Illinois
Filed July 30, 1963, Ser. No. 298,663
6 Claims. (Cl. 144—129)

This invention relates to woodworking machines such as planers, jointers, or the like, and particularly to precision means for adjustably mounting and positioning the cutter head of such machines relative to the outfeed table.

In most presently known machines, such as jointers, height of the outfeed table in relation to the cutter head is manually adjusted by screw means. Due to friction between sliding ways, back-lash between screw and nut, spring between parts, dust and chips, the height adjustment of rear table cannot be regulated to close limits when a screw is used to move the table on an incline. Jointer knives can never be lower than the outfeed table, even by one-half thousandth of an inch, or the jointed edge will not be straight. If knives are lower than outfeed table, when wood pieces have progressed substantially more than half their length through the cutting operation, the wood piece by manual downward pressure will tilt downward with its cut-away face flat upon the horizontal outfeed table of the jointer, this resulting in a different amount or degree of cutting of the blades of the rear or tail portion of the work pieces and resulting in a non-straight face upon the removed work pieces.

It is the object of my invention to provide machines for removing parts of material from faces of workpieces which have novel means for adjustably mounting the power driven blade carrying rotors of jointers whereby the positions of the blades may be very precisely set and held in varying positions of upward projection relative to the plane of the outfeed table.

It is an important object of my invention to provide a machine, such as a jointer, which has a horizontal work supporting bed or out-feed table which is stationary and rigid, and in which the transverse shaft and the rotatable blade-carrying member is eccentrically mounted and selectively adjustable vertically to vary the position of the cutting edges of the blades relative to the plane of the upper face of the rigid supporting out-feed table so that uniform cutting away of the wood pieces over the entire length of the wood pieces will result and so that varying amounts of material will be cut away during each longitudinal movement of the work pieces.

A further important object and accomplishment of my invention is the provision of machines, such as jointers and planers, having a pair of passaged mounting brackets which carry suitable bearings therein respectively, and which have adjustable cam means for selectively mounting a transverse shaft at varying heights, said shaft having a blade-carrying rotor mounted thereon by means of suitable bearings, whereby the positions and degree of projection of such blades may be selectively pre-set and held at desired positions relative to the plane of the work-engaging face of the tables of such jointers and wherein such pre-setting will be determined by the hardness of the work pieces.

A further object of my invention is the provision of novel means for adjustably mounting a pair of spaced apart eccentric cams in which a transverse shaft is mounted, said transverse shaft having bearings thereon mounting a power-driven rotor which carries the radially or tangentially projecting cutting blades thereon to provide for varying degrees of cutting of wood pieces moved into engagement with the projecting cutters; and, further, to provide novel manually operable mechanism for raising and lowering and holding a movable in-feed work table, the position of which relative to the cutting blades will result in the desired degree of uniform cutting and removal of wood or other material from work pieces so that the resulting face will be in a common plane.

Other and further important objects of my invention will be apparent from the following description and appended claims.

On the drawings:

FIG. 3 is an enlarged fragmentary elevation looking from the right and upon a vertical plane indicated by line 3—3 of FIG. 2.

As shown on the drawings:

Figure 1:
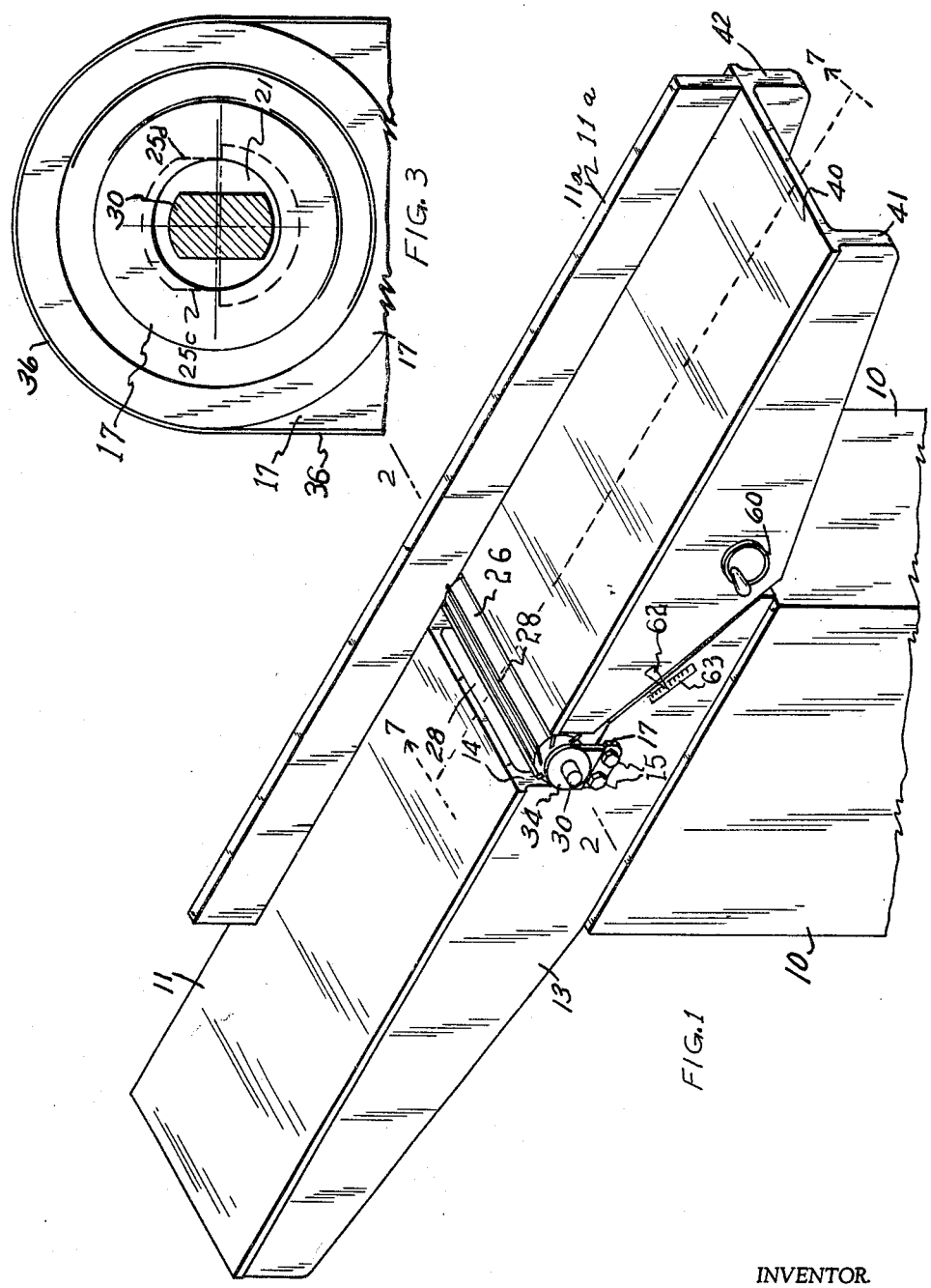
FIG. 1 is a perspective view of the upper portion of a jointer embodying my invention, and with the lower portion of the supporting standard broken away.
Figure 2:
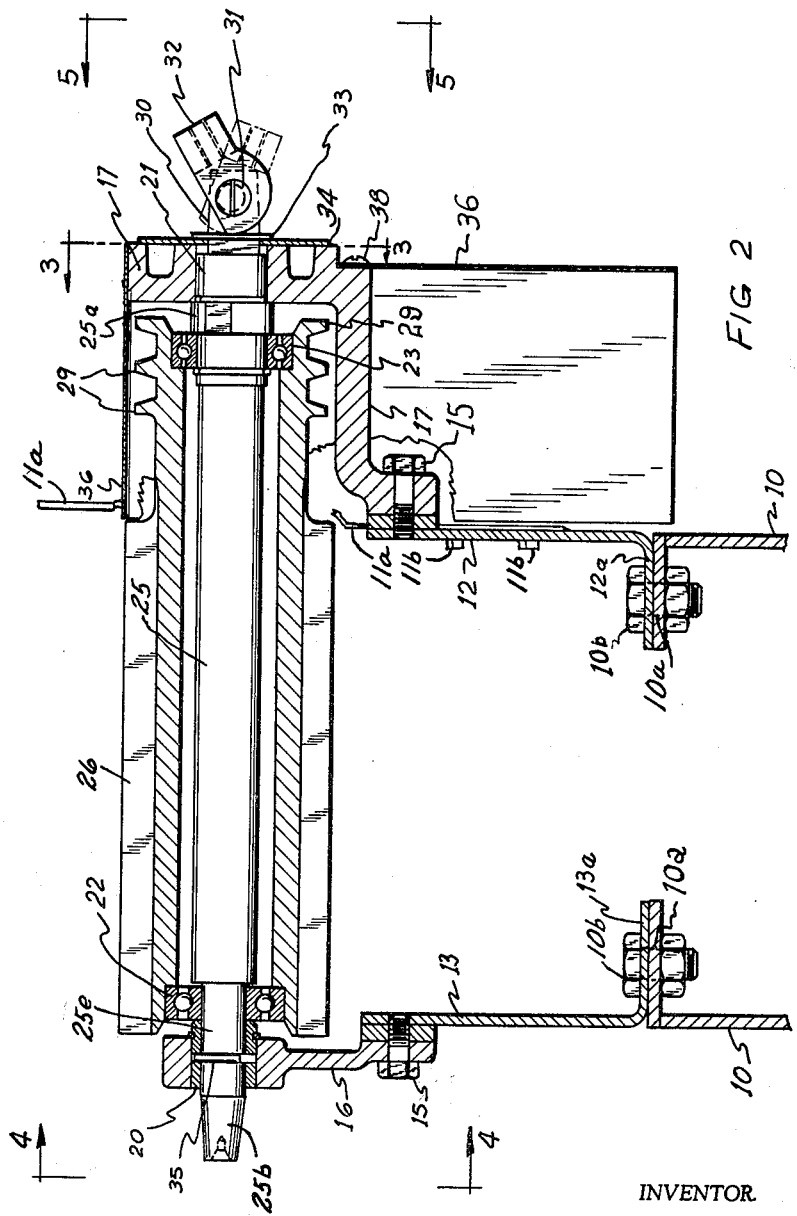
FIG. 2 is an enlarged cross sectional view taken on a transverse vertical plane indicated by the line 2—2 of FIG. 1.

Numeral 10 in FIG. 2 designates the upper portion of a hollow metal base of substantially rectangular cross section in which an electric motor (not shown), is suitably supported. Said base 10 has its upper side wall portions bent inwardly and bears apertures 10a which receives bolts 10b for securing thereto the middle inwardly extending and depending portions 12a and 13a of ribs 12 and 13 of work table 11, FIG. 1.

Numeral 11 designates an elongated horizontally extending flat rigid work table or bed. Said bed 11 has two integral depending reinforcing webs 12 and 13 which rigidly support the table or work bed 11. A vertically extending fence plate 11a is mounted adjacent one edge portion of said table 11 and its lower portion is attached to depending web 12 by bolts 11b. At the inner end of said work table 11 and of said webs 12 and 13 is an enlarged tranversely extending recess 14, as illustrated in FIG. 1.

Mounted by suitable bolts on web 13 is an upwardly extending metal journalling bracket 16 in the upper passage of which an eccentric collar or sleeve 20 is mounted preferably by means of a pin 35 extending into shaft 25, as hereinafter described. As shown in FIG. 2, mounted by means of a pair of bolts 15 on depending web 12 is an angular passaged offset metal bearing bracket 17 whose upper passage provides a mounting means for a second eccentric 21, hereinafter described.

Eccentric 21 is formed integral with the end portion of shaft 25 and said shaft and eccentric are adjustably mounted in the passage of bracket 17. Portion 21 of shaft 25 has its eccentric exterior annular face adjustably mounted in the passage of bracket 17, said eccentric being selectively positionable to set the transverse shaft 25 at varied desired heights. Portion 25a of shaft 25 (FIG. 2), has two opposite exposed faces 25c and 25d (FIG. 3), relatively flat, to provide for manually gripping the shaft for setting it for subsequent operations. Projecting portions 25b and 30 of shaft 25 are tapered and receive eccentrically centered blocks for grinding eccentric bushing 20 and portion 21 of shaft 25. The eccentric bushing 20 of shaft 25 fits in and is rotatable in the horizontal passage of the head of bracket 16.

Figure 4:
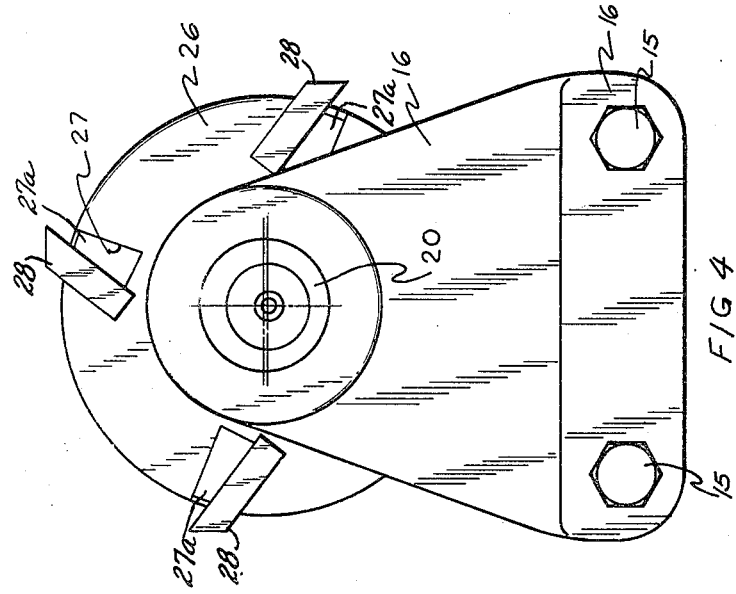
FIG. 4 is an enlarged elevational view taken substantially on a vertical plane indicated by lines 4—4 of FIG. 2.
Figure 5:
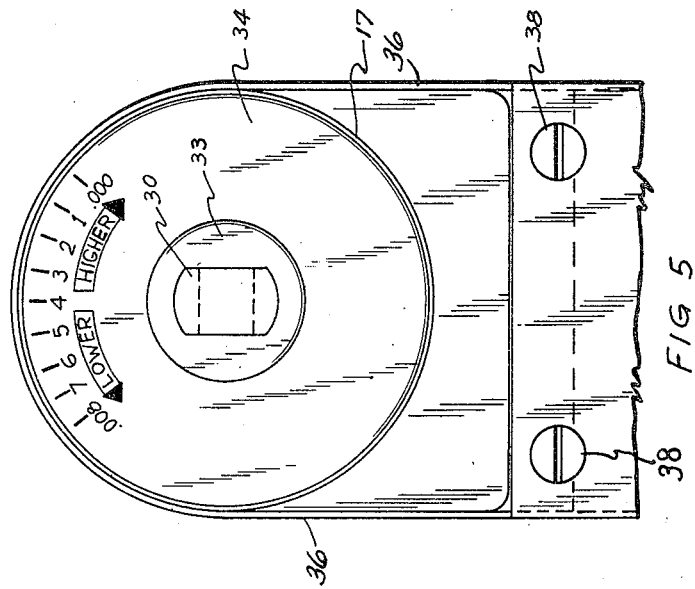
FIG. 5 is an enlarged fragmentary elevational view taken on a vertical plane indicated by line 5—5 of FIG. 2.

Eccentric bushing 20, shown at the left of FIG. 2, and in FIG. 4, is secured to the end portion of shaft 25 by pin 35 to adjustably mount one end portion of shaft 25 at the desired height relative to the upper face of work table 11. It will be understood that shaft 25 will be set horizontally at the desired height and relative to the work table by the described means Said eccentric bushing 20 and said eccentric 21 are both mounted on shaft 25 in correspondingly aligned similar positions to produce the important advantage of pre-setting the said shaft and eccentrics simultaneously and by a single manual movement of the projecting cam 32.

In assembling shaft 25, cutter head 26 and ball bearing 22 and 23, the eccentric bushing 20 must be removed, and when the same are assembled, a tapered securing pin 35 is mounted in diametrically extending holes in said bushing 20 and in shaft 25.

A ball bearing 23 is assembled onto shaft 25 from left end of FIG. 2, pressing against shoulder portion 25a. A ball bearing 22 is securely mounted on the end portion 25e of shaft 25 against an annular shoulder of shaft 25, as shown at the left of FIG. 2.

Figure 6:
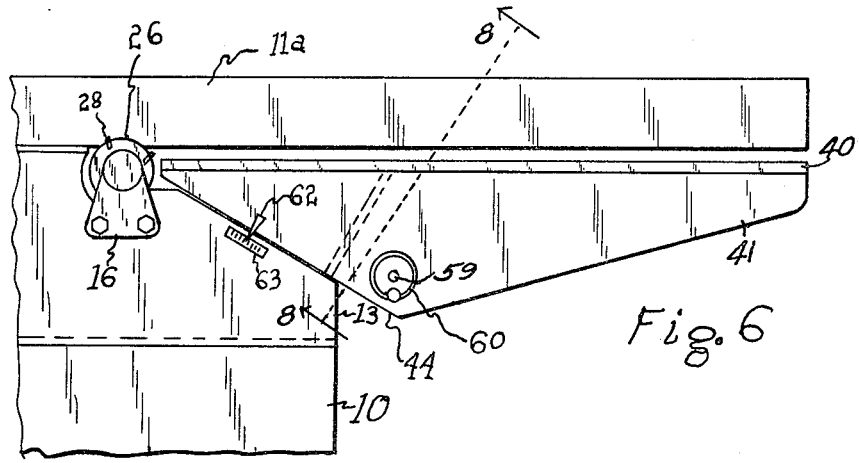
FIG. 6 is an enlarged fragmentary elevation of one end portion of said machine illustrating the adjustable in-feed table and adjacent parts.
Figure 7:
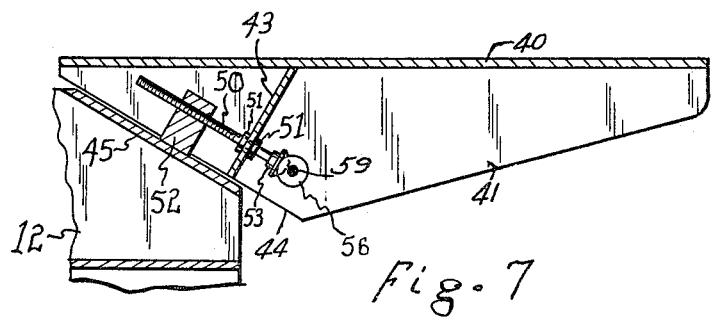
FIG. 7 is a cross sectional view taken on a vertical plane indicated by lines 7—7 of FIG. 1.
Figure 8:
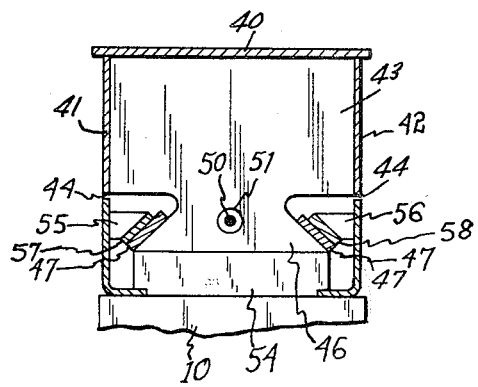
FIG. 8 is a cross sectional view on an inclined plane indicated by the line 8—8 of FIG. 6.

As illustrated in FIGS. 1, 6, 7 and 8, a movable infeed table 40 having connected depending side plates 41 and 42 has transversely extending connecting and mounting plates 43, as shown in FIG. 8.

Said side plates 41 and 42 have lower inclined edges 44 which are normally spaced upwardly from the inclined end portion 45 of the stationary table 11. Said mounting plates 43 have integral depending reduced portions 46 which are recessed to provide oppositely inclined edges on which are suitably secured respectively a pair of inclined metal rails 47.

As illustrated in FIG. 8, the lower straight edges 44 are slidably mounted on the inclined upper faces 45 of webs 12 and 13.

A plurality of inwardly extending metal arms or lugs 55 and 56 have one end of each thereof secured, for example by welding, to the webs 12, 13 respectively, as illustrated in FIG. 8.

A metal rail 57 is suitably secured, for example by welding, to the inner ends of two of the spaced apart lugs 55 and a second metal rail 58 is suitably secured to two spaced apart lugs 56. Said rails 57 and 58 are in angular position as indicated in FIG. 8 and they slidably engage the rails 47 respectively to thereby provide a slidable inclined mounting for the in-feed table 40.

An enlongated screw 50 extends through an aperture in mounting plate 43 and has secured on it two thrust bushings 51 on opposite sides of said aperture. A passaged bearing block 52 is secured to the stationary inclined wall 45 and its passage is threaded, as illustrated in FIG. 7, so that said screw 50 threads in said block 52.

Mounted on the lower end of said screw 50 is a beveled gear 53. A shaft 59 is journalled in apertures in depending plates 41, 42, and carries thereon a hand wheel or crank 60. On the middle portion of said shaft 59 is secured a beveled gear 56 which meshes with gear 53.

A substantially cylindrical blade mounting and holding cutter-head or rotor 26, which has a plurality of radially and tangentially opening and longitudinally extending recesses or grooves 27, one of which is shown in FIG. 4, has its opposite ends mounted upon the outer races of said ball bearings 22 and 23, as shown in FIG. 2, said bearings being seated in annular recesses in the opposite ends of said rotor, as illustrated. Cutting blades 28 (one of which is shown in FIG. 4), are removably and replaceably mounted by wedge blocks or keys in the grooves 27, respectively, so that their outer cutting edges project radially from said rotor to an equal degree.

Said cutter-head 26 carries a pair of integral annular grooved pulleys 29, as illustrated in FIG. 2, the same being preferably formed integral with said cutter-head 26. One or more V-belts (not shown), which extend downwardly and are operatively connected to pulleys of an electric motor (not shown), are adapted to drive said rotor 26. A metal shield or guard 36 is secured over the pulleys 29 and has one portion thereof secured on the outer edge portion of bracket 17 by screws 38 to guard against accidental contact of the pulleys, as illustrated in FIG. 2.

As shown in FIG. 2, the shaft 25 has an outwardly projecting passaged end portion 30 which is milled flat on two opposite sides and on which is pivotally mounted by means of a pin 31 a metal passaged cam 32 whose cam face bears against a metal washer 33. Said cam 32, when moved to engage its face against washer 33, provides for manual locking and impingement of the shaft 25 and its enlarged portion 25a in desired positions against the inner face of bracket 17 and at a height corresponding to the height of the shaft and cutter-head desired.

Shaft 25 has an integral enlarged portion 25a and reduced portions 25b and 25e which are concentric with said shaft and one end of portion 25a engages and impinges upon the inner face of bracket 17, as shown in FIG. 2.

A dial plate 34, which bears graduations and numerals on its periphery, is held in position by shaft end 30 against the outer face of the head of bracket 17, said dial plate 34 having a central hole through which the end portion 30 of the shaft 25 extends. Said graduations and numerals provide for an accurate precalculated adjustment of said eccentrics and shaft in relation to the upper face of the table.

It will be understood that said eccentric collar or sleeve 20 and eccentric portion 21 and shaft 25 may be simultaneously adjusted and selectively pre-set and positioned within a range of 180 degrees to thereby set the cutter-head in position so that its blades will project the desired amount above the rear or outfeed table 11 of the jointer. Such adjustment is correctly done by the desired movement of the projecting part of cam 32 after said cam is first moved to disengage its cam face from washer 33.

Said calibrated dial 34 preferably bears spaced numerals and calibrations thereon in terms of thousandths of an inch (either in English or in metric system), so that an operator can make a pre-determined pre-setting according to the wear of the knives, or according to the kind of wood or fiber to be removed.

It will be understood that rotation of hand wheel 60 and of said screw 59 in one direction will lower the infeed table 40 and rotation thereof in the opposite direction will elevate said in-feed table though the upper face of said in-feed table will be maintained horizontally and parallel to the plane of the out-feed table 11 during such manually actuated adjusting movements.

The manual adjustment and setting of in-feed table 40 in relation to the outfeed table 11 controls the thickness of cutting and material removal from the work pieces.

The rotor 26 and its cutting blades are preferably set so that the cuttings edges of the blades 28 will, at their uppermost position, be at substantially the same height as the entering adjacent edge of the outfeed table 11.

My novel means for adjustably mounting cutter-heads and their cutters and my structural combination of parts as described are equally adaptable to the adjustable mounting of cutter-mounting members and of in-feed tables of planers, milling machines, and other machines which are adapted to remove fibrous, cellular and other material from work pieces or the like.

As indicated in FIG. 6, side plate 41 preferably has a pointed indicator 62 secured thereon and projecting downwardly. The side rib or web 13 preferably has a graduated plate 63 secured thereon adjacent its inclined edge wherein said indicator arm 62 will move adjacent and over said plate 63 to thereby indicate the extent of the adjusting movement of said in-feed table.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a jointer or the like having a supporting base and a longitudinally extending rigid out-feed table thereon;
   a movably mounted in-feed table;
   means for adjusting the height of said in-feed table;
   said in-feed table being spaced from the end of said out-feed table to provide a transverse upwardly opening recess;
   a pair of upwardly extending passaged journalling brackets secured on opposite sides of said table and positioned adjacent opposite ends of said recess;
   a transverse shaft having its opposite end portions supported by said brackets respectively;
   an eccentric collar secured on one end portion of said shaft; an eccentric on the opposite end portion of said shaft, said collar and said eccentric being rotatively and adjustably mounted in the passages of said journalling brackets respectively;
   an elongated blade-carrying rotor journalled on said shaft;
   bearings between the ends of said rotor and said shaft;
   a plurality of outwardly extending cutting blades mounted on said rotor;
   and manually adjustable means for selectively adjusting and releasably securing said eccentrically supported shaft to thereby selectively mount said shaft and said rotor and blades at varying heights relative to said table said adjustable means including a cam lever pivoted on one end of said shaft adapted to press against one of said journalling brackets to hold said shaft in desired pre-set position.

2. In a machine for removing stock from wood or fibrous pieces having a longitudinally extending out-feed table and an adjustably mounted in-feed table and a support for said tables;
   said tables being spaced apart to provide a transverse slot therebetween;
   a front upwardly extending journalling bracket secured to said out-feed table and positioned adjacent one end of said slot;
   a second passaged journalling and mounting bracket connected to the opposite side of said out-feed table;
   an eccentric collar mounted in said front journalling bracket;
   a transverse shaft having one end portion mounted in said eccentric of said front bracket;
   an eccentric member on the other end of said shaft and adjustably mounted in a passage of said second journalling bracket;
   an elongated blade-carrying cutter-head journalled on said shaft;
   a plurality of outwardly and tangentially extending cutting blades removably and adjustably mounted on said cutter-head;
   bearings between the ends of said cutter-head and said shaft;
   and manually adjustable means including a cam-bearing lever pivotally connected to one end of said shaft for selectively adjusting and releasably securing said shaft and said eccentrics in selected positions to thereby selectively and securely mount said shaft at varying heights relative to said out-feed table.

3. In a machine for removing wood or the like from elongated pieces thereof, a longitudinally extending rigid rear table;
   a movable in-feed table;
   a base supporting said tables;
   the inner ends of said tables being spaced apart to provide a transverse recess;
   a pair of upwardly extending passaged journalling brackets connected to said table and positioned adjacent opposite ends of said recess;
   an eccentric collar movably mounted in one of said journalling brackets;
   a transverse shaft having one end portion securely mounted in said eccentric collar;
   said shaft having an eccentric on its opposite end journalled in one of said brackets;
   and elongated blade-carrying rotor journalled on said shaft;
   bearings between the ends of said rotor and said shaft;
   a plurality of outwardly and tangentially extending cutting blades mounted on said rotor;
   said shaft having an enlarged portion adjacent one of said brackets;
   and manually adjustable means pivotally connected to one end of said shaft for selectively adjusting and releasably securing said eccentrically supported shaft in desired position relative to one of said brackets to thereby selectively mount said shaft and said rotor at varying heights relative to said rear table,
   said adjustable means including a manually actuable pivoted cam-bearing member connected to one end of said shaft and adapted to engage a stationary portion of one of said brackets to hold said shaft in selected position.

4. A jointer as recited in claim 1, and having an inclined adjustable support for said in-feed table, including a pair of stationary rails; and having a pair of inwardly extending arms slidably engaging said rails of said support for said table;
   a stationary block mounted on said support and having a threaded passage therein and manually actuable screw means mounted on said in-feed table threadingly engaging said passage of said block whereby said in-feed table is selectively movable in upward or downward diagonal directions.

5. A machine substantially as recited in claim 3 and having means for slidably mounting said in-feed table comprising a pair of inclined rails and a plurality of lugs on said in-feed table slidably mounting said rails, and manually operable means for selectively raising and lowering said in-feed table relative to said cutting blades,
   said manually operable means including a theaded screw and a separate journalled shaft; a gear means operatively connecting said screw and said shaft, the rotation of said screw and said shaft being adapted to raise or lower said in-feed table.

6. In a machine for removing stock from wood or fibrous pieces having a longitudinally extending out-feed table and an adjustably mounted in-feed table and a support for said tables;
   said tables being spaced apart to provide a transverse slot therebetween;
   a front upwardly extending journalling bracket secured to said out-feed table and positioned adjacent one end of said slot;
   a second passaged journalling and mounting bracket connected to the opposite side of said out-feed table;
   an eccentric collar mounted in said front journalling bracket;
   a transverse shaft having one end portion mounted in said eccentric collar of said front bracket;
   an eccentric member on the other end of said shaft and adjustably mounted in said passage of said second journalling bracket;

an elongated blade-carrying cutter-head journalled on said shaft;

a plurality of outwardly and tangentially extending cutting blades removably and adjustably mounted on said cutter-head;

bearings between the ends of said cutter-head and said shaft;

manually adjustable means including a cam-bearing lever pivotally connected to one end of said shaft for selectively adjusting and releasably securing said shaft and said eccentrics in selected positions to thereby selectively mount said shaft and said cutter-head at varying heights relative to said outfeed table;

said cutter head having means for engaging driven pulleys;

and said cam-bearing lever being manually actuable and adapted to engage a portion of said second mounting brackets to hold said shaft in selected set positions;

said shaft having an enlarged intermediate portion adapted to engage the upper portion of one of said brackets upon actuation of said cam-bearing member to securely hold said shaft in fixed position;

and having a calibrated indicia-bearing plate mounted adjacent one end portion of said shaft to facilitate movement and setting of said shaft to a predetermined degree;

said cam-bearing lever being adapted to facilitate rotative setting movement of the entire shaft to desired height.

References Cited by the Examiner

UNITED STATES PATENTS

| | | | |
|---|---|---|---|
| 354,773 | 12/86 | Clement | 144—129 |
| 1,676,290 | 7/28 | Schron | 269—196 |
| 1,701,912 | 2/29 | De Walt | 144—131 |
| 1,802,800 | 4/31 | Wilderson | 144—131 |
| 2,804,107 | 8/57 | Taylor | 144—129 |

ANDREW R. JUHASZ, *Primary Examiner.*

DONALD R. SCHRAN, WILLIAM W. DYER, JR., *Examiners.*